United States Patent Office 3,257,166
Patented June 21, 1966

3,257,166
PROCESS FOR THE PRODUCTION OF
MAGNESIUM FLUORIDE
Simcha Harel, Haifa, Zevoulun Pessahovitz, Kibutz Maagan Michael, Charles (Haim) Klein, Akko, and Benjamin Peskin, Givat Nesher, Israel, assignors to Chemicals & Phosphates Ltd., Haifa Bay, Israel, a company of Israel
No Drawing. Filed May 29, 1963, Ser. No. 284,005
9 Claims. (Cl. 23—88)

It is an object of the present invention to provide a novel process for the production of magnesium fluoride. It is a further object of the present invention to provide a process for the production of crystalline magnesium fluoride which can be easily filtered. It is yet a further object of the present invention to provide a process for the production of magnesium fluoride which is characterized in that use can be made of dilute fluoride solutions remaining as byproducts from other processes of manufacture. It is still a further object of the present invention to provide a process wherein concentrated fluoride solutions can be used, so as to provide for the possibility to use relatively smaller vessels. It is still a further object of the present invention to provide a process for the manufacture of magnesium fluoride which may be used for the subsequent conversion into magnesium potassium fluoride. It is yet a further object of the present invention to provide a continuous process for the production of magnesium fluoride. Other and further objects of the invention will become apparent hereinafter.

Magnesium fluoride can be produced by the reaction of magnesium oxide or magnesium carbonate with hydrofluoric acid. This process has a number of drawbacks. Hydrofluoric acid is relatively expensive and its use is inconvenient and dangerous; the conversion is generally incomplete and as magnesium oxide and carbonate generally contain some calcium salts, the final product is usually contaminated with calcium salts. A second method is the reaction of a solution of an alkali fluoride with a solution of a magnesium salt. Generally, the product is obtained in the form of a very fine precipitate which can be filtered only with difficulty and sometimes there are obtained colloidal precipitates. An improvement was suggested in British Patent No. 567,260, according to which sodium fluoride is introduced in finely divided state (as spray of an aqueous solution) into a highly agitated dilute solution of magnesium sulfate. According to the present invention there is obtained a product which can be filtered much quicker (about 10 times as fast), which retains less water and which is produced by a process which is simpler and economically advantageous.

The process according to the present invention comprises introducing, substantially simultaneously, aqueous solutions of a magnesium salt and of a fluoride into a reaction vessel which contains a quantity of water or of mother liquor remaining from a previous batch and maintaining the reaction mixture at an elevated temperature and in an agitated state during the reaction. The magnesium salt and the fluoride are used in stoichiometric quantities. The process can also be carried out in a continuous manner, and in this case a quantity of slurry of the product is withdrawn at the rate of addition of the reactants. Best results are obtained when both solutions are added at such a rate as to prevent even a temporary substantial excess of either ions of magnesium or of fluoride, and when the reaction mixture is maintained at a temperature of about 70° C. or in the range of from 60° C. to the boiling point of the reaction mixture. The concentrations of the added solutions can be varied within wide limits, but it is preferred to make use of fluoride solutions containing about 6 percent by weight of fluorine and to make use of solutions containing about 4 percent by weight of magnesium. At these concentrations the ratio of volumes of the solutions is about one to one. It is possible to use quite dilute solutions of fluorides, such as for example solutions remaining from other processes of production. The solution of fluoride can contain 0.3 to 8.0% by weight fluoride calculated as fluorine. The magnesium salt solution can contain 4 to 18% by weight of magnesium salt. The best results are obtained when the time of addition is such as to vary between 30 to about 100 minutes. The longer the period of addition, the larger will be the crystals of the produced product and the better the filterability of same.

Although the preferred magnesium salt is the chloride, there may be used other water-soluble magnesium salts, such as the sulfate, nitrate, etc. Any water-soluble fluoride may be used, such as potassium fluoride, sodium fluoride, ammonium fluoride or mixtures of any of these.

It is one of the outstanding advantages of the novel process that comparatively concentrated solutions of magnesium salts and of fluorides may be used and that consequently the process can be carried out in comparatively small vessels.

When the time of reaction is about 30–40 minutes only, there is obtained a thixotropic product which may be used for the production of potassium magnesium fluoride. Thixotropic magnesium fluoride can also be produced by reacting ammonium fluoride with a water-soluble magnesium salt, even if the addition of the solutions is carried out during periods of about 90 minutes. The pH of the reaction mixture decreases during this reaction, and when it is desired to obtain a crystalline product by the reaction with ammonium fluoride, the pH of the reaction mixture must be maintained at about neutral during the reaction.

A better and fuller understanding of the invention may be had by referring to the following examples which are to be construed in an illustrative and non-limitative sense.

*Example 1*

A quantity of 500 ml. aqueous potassium ammonium fluoride of molar ratio of 1 mole potassium fluoride per 2 moles ammonium fluoride, containing 5.8 percent by weight fluorine was added simultaneously with 447 ml. of 16.1% by weight magnesium chloride into a vessel containing 500 ml. water. The addition was carried out at a steady rate during 40 minutes and the reaction mixture was maintained during this time at 90° C. There was obtained a thixotropic product which could be filtered rapidly. After washing and drying at 110° C. there was obtained 52.5 g. magnesium fluoride, which lost on ignition 9 percent by weight.

*Example 2*

A quantity of 634 ml. aqueous ammonium fluoride containing 6.0 percent by weight fluorine was added simultaneously with a quantity of 634 ml. 15.0 percent by weight magnesium chloride into a vessel containing 500 ml. of water. The addition was carried out during 40 minutes and the reaction mixture was maintained at 85° C. The product was filtered at a rate of 1400 ml./min. by vacuum filtration on a Büchner funnel of 4″ diameter. After washing and drying at 105° C. there was obtained 68.5 g. magnesium fluoride, which lost 10 percent of its weight on ignition.

*Example 3*

One liter of water was heated in a stainless steel vessel to 90° C. and there was added at a rate of 1 liter per 15 minutes 1 liter each of a 56 g./l. fluorine solution (1 mole potassium fluoride per 2 moles ammonium fluoride) and a 140 g./l. solution of magnesium chloride. A total of 18 liters of each of these solutions was added, while a slurry of magnesium fluoride was withdrawn at the same rate. The slurry was filtered batchwise in batches of 3 liters and the rate of filtration was 1800 ml./min. The filtered product was washed with water and dried. It contained 89% magnesium fluoride, 1.5% potassium fluoride, 1.5% sodium fluoride, 0.7% silicon dioxide and 8.6% water. The yield was substantially theoretical.

*Example 4*

To 500 ml. water there was added during 1 hour 2000 ml. of mother liquor remaining after the production of sodium fluoride, containing 36 g. fluorine and 1000 ml. 9.1% magnesium chloride. The reaction mixture was stirred during this period and maintained at 90° C. The precipitate was filtered with suction. The time of filtration was 4 minutes (4″ Büchner funnel). The magnesium fluoride was washed and dried. The filtrate contained 0.26 g. of fluorine. There was obtained 63.1 g. magnesium fluoride which lost 8% of its weight by ignition.

*Example 5*

A run was carried out as in Example 4, but with 1 liter of 11.4% magnesium sulfate instead of magnesium chloride. 63 g. magnesium fluoride was obtained; ignition loss: 6%.

*Example 6*

6000 ml. aqueous ammonium fluoride (6.1 g. fluorine per liter) was added simultaneously with 600 ml. magnesium chloride solution containing 91 g. magnesium chloride to 100 ml. water with vigorous stirring. The addition was carried out during 90 minutes at 100° C. and a pH of 7 was maintained. There was obtained 59.5 g. of a nearly granular product which was filtered at a rate of 1700 ml./min. The ignition loss was 9.7%.

What we claim is:

1. A process for the production of magnesium fluoride which comprises gradually and substantially simultaneously introducing with stirring a liquid aqueous solution of a water soluble fluoride of 0.3 to 8.0% by weight fluoride calculated as fluorine and a liquid aqueous solution of a water-soluble magnesium salt of 4 to 18% by weight in substantially stoichiometric ratio into a reaction vessel containing an initial quantity of water, maintaining the reaction mixture at a temperature in the range between 60° C. and the boiling temperature of the reaction mixture, and separating the formed magnesium fluoride from the mother liquor.

2. A process as claimed in claim 1, wherein the magnesium salt is a member of the group consisting of magnesium chloride, magnesium nitrate and magnesium sulfate and where the fluoride is a member of the group consisting of ammonium fluoride, potassium fluoride, sodium fluoride and mixtures of any of these.

3. A process as claimed in claim 1, wherein the solution of the fluoride contains about 6 percent by weight fluoride calculated as fluorine.

4. A process as claimed in claim 1, wherein there is used a magnesium salt solution of about 4 percent by weight of magnesium salt.

5. A process as claimed in claim 1, wherein the addition of the solutions is effected during 30 to 100 minutes.

6. A process for the production of rapidly filterable thixotropic magnesium fluoride which comprises introducing gradually and simultaneously with stirring substantially stoichiometric quantities of a liquid aqueous solution of a fluoride of 0.3 to 8.0% by weight fluoride calculated as fluorine and a liquid aqueous solution of a magnesium salt of 4 to 18% by weight into a reaction vessel during 30 to 50 minutes, maintaining the reaction mixture at a temperature from 60° C. to the boiling temperature of the reaction mixture and separating the product.

7. A process for the production of rapidly filterable magnesium fluoride which comprises simultaneously gradually admixing in a reaction vessel a liquid aqueous solution of a magnesium salt of 4 to 18% by weight and a liquid aqueous solution of ammonium fluoride of 0.3 to 8.0% by weight fluoride calculated as fluorine in substantially stoichiometric quantities, the admixture being effected during a period from 30 to 100 minutes, while the stirred reaction mixture is maintained at from 60° C. to its boiling temperature and at a pH of about 7.

8. A process as claimed in claim 7, characterized in that the solutions are added to an initial quantity of water or of a mother liquor remaining from the production of a previous batch.

9. A continuous process for the production of rapidly filterable magnesium fluoride, which comprises admixing substantially simultaneously stoichiometric quantities of a liquid aqueous solution of a water-soluble fluoride of 0.3 to 8% by weight fluoride calculated as fluorine and a liquid aqueous solution of a water-soluble magnesium salt of 4 to 18% by weight, maintaining the stirred reaction mixture at from 60° C. to its boiling temperature, withdrawing the slurry of magnesium fluoride at the rate of addition of the solutions, the time of reaction being from 30 to 100 minutes.

References Cited by the Examiner

UNITED STATES PATENTS

| 2,800,389 | 7/1957 | Mockrin | 23—88 |
| 2,877,095 | 3/1959 | Anderson | 23—88 |
| 2,972,515 | 2/1961 | Mockrin | 23—88 |

BENJAMIN HENKIN, *Primary Examiner.*

MAURICE A. BRINDISI, *Examiner.*

E. STERN, *Assistant Examiner.*